United States Patent
Leroux

(10) Patent No.: US 10,271,097 B2
(45) Date of Patent: Apr. 23, 2019

(54) DYNAMIC RESOLUTION DETERMINATION

(75) Inventor: Dominique Leroux, Montreal (CA)

(73) Assignee: AUTODESK, INC., San Rafael, CA (US)

( * ) Notice: Subject to any disclaimer, the term of this patent is extended or adjusted under 35 U.S.C. 154(b) by 2144 days.

(21) Appl. No.: 11/107,432

(22) Filed: Apr. 15, 2005

(65) Prior Publication Data

US 2006/0232614 A1 Oct. 19, 2006

(51) Int. Cl.
*H04N 21/4402* (2011.01)
*H04N 21/41* (2011.01)
*H04N 21/442* (2011.01)
*H04N 21/462* (2011.01)

(52) U.S. Cl.
CPC . *H04N 21/440263* (2013.01); *H04N 21/4113* (2013.01); *H04N 21/44231* (2013.01); *H04N 21/4621* (2013.01)

(58) Field of Classification Search
CPC ....... H04N 21/440263; H04N 21/4113; H04N 21/44231; H04N 21/4621
USPC ......... 345/3.3, 3.4, 204, 205, 206, 208, 213, 345/428, 698, 699, 501
See application file for complete search history.

(56) References Cited

U.S. PATENT DOCUMENTS

| | | | | |
|---|---|---|---|---|
| 5,448,697 A * | 9/1995 | Parks et al. | | 345/520 |
| 5,612,715 A * | 3/1997 | Karaki et al. | | 345/698 |
| 6,240,243 B1 * | 5/2001 | Chen et al. | | 386/125 |
| 6,310,602 B1 * | 10/2001 | Kasai et al. | | 345/698 |
| 6,339,434 B1 * | 1/2002 | West et al. | | 345/667 |
| 6,348,931 B1 * | 2/2002 | Suga et al. | | 345/699 |
| 6,362,853 B1 * | 3/2002 | Ouchiyama et al. | | 348/556 |
| 6,515,678 B1 * | 2/2003 | Boger | | 345/660 |
| 6,577,322 B1 * | 6/2003 | Fukuda | | 345/698 |
| 6,654,026 B2 * | 11/2003 | Lee | | 345/600 |
| 6,664,977 B1 * | 12/2003 | Masumoto | | 345/698 |
| 6,744,444 B2 * | 6/2004 | Minami et al. | | 345/699 |
| 6,753,881 B1 * | 6/2004 | Callway et al. | | 345/699 |
| 6,816,171 B2 * | 11/2004 | Kim | | 345/699 |
| 6,836,268 B1 * | 12/2004 | Song | | 345/204 |
| 6,909,406 B2 * | 6/2005 | Wilburn et al. | | 345/3.1 |
| 6,982,729 B1 * | 1/2006 | Lange et al. | | 345/660 |
| 7,002,565 B2 * | 2/2006 | Allen et al. | | 345/204 |
| 7,053,864 B2 * | 5/2006 | Lee | | 345/3.4 |
| 7,079,128 B2 * | 7/2006 | Kim | | 345/213 |
| 7,082,572 B2 * | 7/2006 | Pea et al. | | 715/720 |
| 7,180,511 B2 * | 2/2007 | Shigeta | | 345/204 |
| 7,180,531 B2 * | 2/2007 | Gery et al. | | 345/698 |
| 7,212,238 B2 * | 5/2007 | Ohtsuki | | 348/240.99 |

(Continued)

*Primary Examiner* — Sahlu Okebato
(74) *Attorney, Agent, or Firm* — Gates & Cooper LLP

(57) ABSTRACT

A method, apparatus, and article of manufacture provide the ability to dynamically determine and utilize an image resolution. An audio/video clip comprising two or more frames (with each frame comprising a source image having a source image resolution) is obtained. Proxy image(s) associated with each source image are computed. Each proxy image is a scaled version of the source image wherein the source image resolution has been scaled based on a proxy scale to obtain a proxy image resolution. A media player determines display capabilities for a display device and processes the clip. The player then dynamically determines the proxy scale for each frame in the clip, performs image processing for/on a respective proxy image, and displays the respective proxy image.

12 Claims, 4 Drawing Sheets

(56) References Cited

U.S. PATENT DOCUMENTS

| | | |
|---|---|---|
| 7,271,780 B2* | 9/2007 | Cok ................................ 345/1.1 |
| 7,343,052 B2* | 3/2008 | Roth et al. .................... 382/299 |
| 2003/0048281 A1* | 3/2003 | Murai et al. ................. 345/620 |
| 2004/0125148 A1* | 7/2004 | Pea et al. ...................... 345/802 |
| 2005/0097615 A1* | 5/2005 | Moradi et al. ................. 725/90 |
| 2006/0103736 A1* | 5/2006 | Obrador ..................... 348/222.1 |
| 2006/0262032 A1* | 11/2006 | DeLine .......................... 345/1.1 |
| 2007/0079237 A1* | 4/2007 | Abrams et al. ............... 715/700 |

\* cited by examiner

DYNAMIC RESOLUTION DETERMINATION

BACKGROUND OF THE INVENTION

1. Field of the Invention

The present invention relates generally to image/video display and processing systems, and in particular, to a method, apparatus, and article of manufacture for dynamically determining and utilizing a particular image resolution for a display and using such dynamically determined resolution to perform audio/video processing.

2. Description of the Related Art

Audio and video files, in the form of a plurality of digitized frames, are often very large and consume considerable time and bandwidth to display and process. Further, various different display devices may be used to view such digitized frames. However, while a digitized frame may have a high resolution, the display device may not be capable of displaying the frame at such a resolution. Accordingly, a lower resolution image is often used. However, the creation of the lower resolution image is time consuming and the newly created image may not utilize the full capabilities of the display device (i.e., the image resolution may be lower than the capabilities of the display device). Further, the processing of such high resolution images is processor intensive and consumes excessive amounts of time. Accordingly, what is needed is the capability to maximize the capabilities of a display device and perform processing in a quick and efficient manner. These problems may be better understood by describing frame resolutions and prior art methodologies for displaying and processing such frames.

Image data may be created, processed, and stored at various resolutions. As the resolution of an image increases, the size of the data needed to display/render that image also increases. 2K data has become the common format for the scanning and use of film images and commonly consists of a scan of a 35 mm negative image, frame line to frame line, full width of the film in a 4×3 aspect ratio. However, larger (i.e., higher resolution) images may also be used (e.g., 4K or 16K). Nonetheless, with large resolution images, a single frame may be beyond the address space of virtual memory in a 32-bit architecture.

In addition, with high resolution images, a display device or media player executing on a computer may not have the capabilities to display the image. For example, the physical area of a display screen may not be capable of displaying an entire image having a high resolution (e.g., a 4K, 16K or 42K image). For example, to display the full resolution image while displaying the complete image, a higher resolution display device may be necessary. Alternatively, only part of the image at the higher resolution may be displayed. To accommodate the partial images, the full resolution image may be broken up into various tiles of the same (or different) size wherein each tile contains a portion of the full resolution image. When processing or displaying a partial image, the tile(s) that encompass the desired portion of the file are utilized. The use and storage of tiles expedites the processing and display of such high resolution images.

Thus, processing is being driven by the display. If the display is about to display a particular frame, it first determines which tiles of that frame would appear (fully or partially) in the display area and then it will ask the processing subsystem for those frames. Once requested (and only at that point in time), image processing is done and only for those requested tiles. Thus, processing is saved by limiting the amount (i.e., not processing tiles that will not be visible on the screen) and timing of the processing.

In other prior art methods, to display an entire image (using a media player) on a display device (that is not capable of displaying complete high resolution images), the user may be forced to zoom out the image such that fewer pixels are viewed. Accordingly, the full resolution and details of the image are not being viewed by the user. Nonetheless, while the user is viewing the image at a lower resolution, the media player may still be processing and manipulating the large resolution file. Accordingly, any manipulations performed on the image are performed on the high resolution image thereby consuming considerable time and bandwidth.

As described above, when zooming out an image, a different version of the image (e.g., lower resolution image) may be displayed. However, prior art methods may also use the lower resolution image to conduct processing. A lower resolution image that will undergo image processing operations in place of original full resolution material is referred to as a proxy image. Further, the ratio of the full resolution image size to the proxy image size is referred to as the proxy scale.

One further prior art problem arises when selecting the proxy scale. For example, should the proxy scale for an entire clip be selected at a level below, equal to, or more than the current capabilities of a display device to be utilized? The artist will typically choose a proxy scale based on the processing load on their machine; the goal being to be able to work with the material as interactively as possible. Once decisions are made interactively, then the full resolution material is processed off-line to yield the final result. However, not all creative decisions can be done on lower resolution proxies. Accordingly, the artist may work with proxies for some processing and with full resolution material for other processing.

The prior art fails to provide an effective choice for either a single frame or a clip. In a different field of art, three-dimensional (3D) renderers may select a texture map that allows the image to look satisfactory but as small as possible. Further, such 3D rendering systems need to sample texture images that involves computing the average color of a given region of the texture image. Some 3D sampling algorithms may build a pyramid of proxies for a given texture image so that during rendering, computing the average color of large regions of the texture image can be done more efficiently (since each pixel of a proxy image is already an average of a larger group of pixels in the original). Based on the screen pixel being rendered, the 3D renderer is capable of predicting which texture proxy level to sample from so as to maximize rendering speed. However, such prior art 3D renderers are not utilized in 2D image processing systems and are specifically directed towards texture maps and average color calculations.

SUMMARY OF THE INVENTION

A method, apparatus, and article of manufacture provide a method for dynamically determining and utilizing a particular image resolution. Various display devices have limited resolution capabilities. Further, processing large image files that are part of a clip of images may consume considerable time and bandwidth and do not allow an artist to work at interactive rates.

Embodiments of the invention take advantage of the fact that the display device has lower resolution than that of full resolution material. Accordingly, a proxy level is selected that is as small as possible (to save processing and bandwidth), but still has larger resolution than the display (i.e. the pixels in the proxy image are "smaller" than the pixel of the display). Further, various proxy images having lower resolutions than the original large source image may be computed and stored in cache.

In view of the above, embodiments of the invention reduce the use of bandwidth and reduce computation requirements. Further, imported media may go through image processing transformations on-the-fly on its way to the display. Thus, the user is looking at the result of an operation while interactively modifying the control parameters of a series of image processing transformations. To reduce the processing requirements, the pipeline of transformations is provided with a smaller resolution image (fewer pixels, less processing). To determine what proxy resolution is best, the determination/selection must be performed prior to processing. Accordingly, the display end of the system drives the proxy resolution selection.

To enable the above use of proxy images, a media player (that is playing the clip) examines the capabilities of the display device and dynamically determines the appropriate proxy scale to use for each frame in the clip (as the clip is played). Once the proxy scale is determined, the proxy image may be computed and/or requested from cache (e.g., by a subsystem of the media player). Such a computation/request may be performed within the media player merely by referencing a proxy scale that identifies the ratio of the source image resolution to the proxy image resolution. The specified proxy scale to be used likely reflects a proxy image resolution that is higher than the resolution of the display device (e.g., just beyond the display device resolution) but lower than the source image resolution.

Additionally, any image processing such as color correction, compositing, etc., may be performed on the specified proxy image rather than the original source image. Such image processing expedites the image processing time. Further, the use of the reduced resolution proxy images allows the system and media player to remain responsive to other requests and processing regardless of whether the original source image resolution is large or small.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
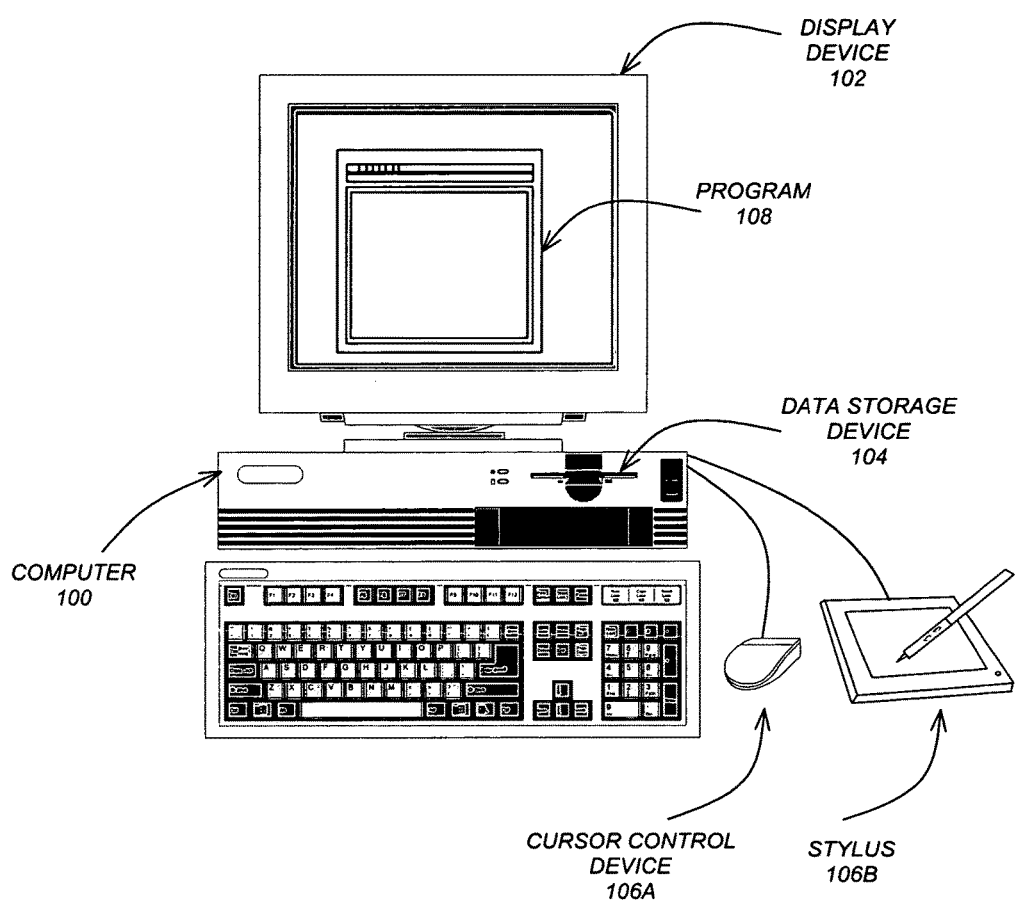
FIG. 1 is an exemplary hardware and software environment used to implement one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.
Hardware Environment FIG. 1 is an exemplary hardware and software environment used to implement one or more embodiments of the invention. Embodiments of the invention are typically implemented using a computer 100, which generally includes, inter alia, a display device 102, data storage device(s) 104, cursor control device 106A, stylus device 106B, and other devices. Those skilled in the art will recognize that any combination of the above components, or any number of different components, peripherals, and other devices, may be used with the computer 100.

One or more embodiments of the invention are implemented by a computer-implemented program 108. Such a program may be a media player, a video editing program, an effects program, compositing application, or any type of program that executes on a computer 100. The program 108 may be represented by a window displayed on the display device 102. Generally, the program 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc. In addition, program 108 (or other programs described herein) may be an object-oriented program having objects and methods as understood in the art.

Figure 2:
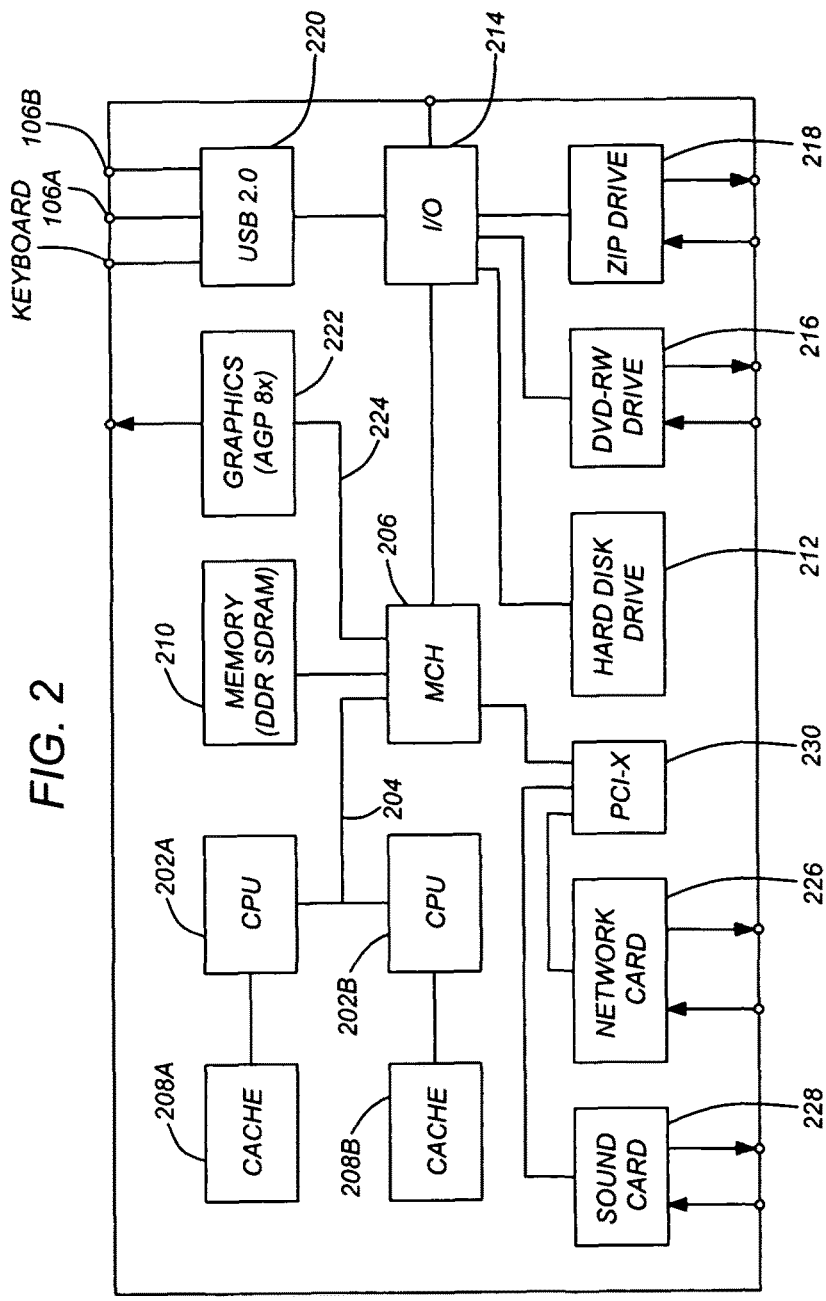
FIG. 2 illustrates details of the computer system of FIG. 1 in accordance with one or more embodiments of the invention.

The components of computer system 100 are further detailed in FIG. 2 and, in the preferred embodiment of the present invention, said components are based upon the INTEL® E7505 hub-based chipset.

The system 100 includes two INTEL® PENTIUM™ XEON™ DP central processing units (CPU) 202A, 202B running at three Gigahertz, that fetch and execute instructions and manipulate data via a system bus 204 providing connectivity with a Memory Controller Hub (MCH) 206. CPUs 202A, 202B are configured with respective high-speed caches 208A, 208B comprising at least five hundred and twelve kilobytes, which store frequently-accessed instructions and data to reduce fetching operations from a larger memory 210 via MCH 206. The MCH 206 thus co-ordinates data flow with a larger, dual-channel double-data rate main memory 210, that is between two and four gigabytes in data storage capacity and stores executable programs which, along with data, are received via said bus 204 from a hard disk drive 212 providing non-volatile bulk storage of instructions and data via an Input/Output Controller Hub (ICH) 214. The I/O HUB 214 similarly provides connectivity to DVD-ROM read-writer 216 and ZIP® drive 218, both of which read and write data and instructions from and to removable data storage media. Finally, I/O hub 214 provides connectivity to USB 2.0 input/output sockets 220, to which the stylus and tablet 106B combination, keyboard, and mouse 106A are connected, all of which send user input data to system 100.

A graphics card 222 receives graphics data from CPUs 202A, 202B along with graphics instructions via MCH 206. The graphics card 222 may be coupled to the MCH 206 through a direct port 224, such as the direct-attached advanced graphics port 8X (AGP 8X) promulgated by the Intel® Corporation, the bandwidth of which exceeds the bandwidth of bus 204. The graphics card 222 may also include substantial dedicated graphical processing capabilities, so that the CPUs 202A, 202B are not burdened with computationally intensive tasks for which they are not optimized.

Network card 226 provides connectivity to a framestore by processing a plurality of communication protocols, for instance a communication protocol suitable to encode and send and/or receive and decode packets of data over a Gigabit-Ethernet local area network. A sound card 228 is provided which receives sound data from the CPUs 202A, 202B along with sound processing instructions, in a manner similar to graphics card 222. The sound card 228 may also include substantial dedicated digital sound processing capabilities, so that the CPUs 202A, 202B are not burdened with computationally intensive tasks for which they are not optimized. Network card 226 and sound card 228 may exchange data with CPUs 202A, 202B over system bus 204 by means of Intel®'s PCI-X controller hub 230 administered by MCH 206.

Those skilled in the art will recognize that the exemplary environment illustrated in FIGS. 1 and 2 are not intended to limit the present invention. Indeed, those skilled in the art will recognize that other alternative environments may be used without departing from the scope of the present invention.

Software Environment

As described above, a software application 108 such as a media player may execute on computer 100. As used herein, the software application 108 will be referred to as the media player 108. A media player 108 is software that is configured to "play" audio, video, or animation files. Such audio, video, or animation files are often set forth in the form of numerous frames within a clip. Accordingly, a clip is a set of formatted frames. A media player 108 may have various functionality such as the ability to zoom in or out a clip that is being "played". Further, a media player 108 may be configured to perform image processing similar to an editing or compositing application. As used herein, the media player 108 encompasses both an application that "plays" a clip and an image processing application (or is configured to communicate with such an image processing application). In this regard, the media player 108 may be viewed as having various subsystems including a display subsystem that requests and displays particular images (as described below) and an image processing subsystem that performs image processing for the display subsystem.

As described above, in the prior art, a display device 102 may have various limitations such as limited resolution capabilities. Accordingly, a display device 102 may not be capable of displaying a frame (e.g., audio, video, or animation) having a large amount of data (e.g., 2K, 4K, 16K, etc.). In this regard, to display the frame at its full resolution, the display device 102 capabilities may require that only a portion of the frame be displayed. For example, if a frame's resolution provides for 1920 pixels, but the display device 102 resolution is limited to 1056 pixels, only a portion of the pixels in the frame may be displayed on the display device. Accordingly, a user may be forced to utilize scroll bars within the media player 108 if the user desires to display the maximum resolution of the frame.

Alternatively, if the user desires to display the entire frame, the user may opt to have the media player 108 zoom out such that the resolution is reduced and fewer pixels are needed to display the entire frame/image. When the media player 108 zooms out to accommodate a single frame in a clip, the same proxy scale may be set for the remaining frames in the clip. However, some frames in a clip may have different resolutions. Accordingly, the same proxy scale will have a negative impact on such slides in failing to provide for the maximum resolution for every frame in the clip. Further, the proxy scale selected may likely be below the resolution capabilities of the display device 102 (for certain frames). In this regard, the user may be viewing a lower resolution (and thereby lower quality) image than is necessary. Also, the user may view a noticeable difference between frames that are viewed through the media player 108.

In addition to the above, the prior art may force the smaller resolution image to be processed/created when the smaller resolution/proxy scale is requested. Accordingly, the user experiences a time delay (while waiting for the creation of the proxy image) whenever a zoom function is performed or whenever the media player 108 has to scale an image.

To overcome the problems of the prior art, the present invention provides for an enhanced media player 108. As used herein, the enhanced media player 108 may be referred to as either a media player 108 or as an enhanced media player 108. The enhanced media player 108 is configured to compute the proxy scale automatically so that pixels are smaller than the resolution of the display device 102. Such automated determination is performed dynamically (on-the-fly) and the proxy scale can change from frame-to-frame as a clip is played in the media player 108. In addition, the selected proxy scale may be higher than the resolution capabilities of the display device 102 but lower than the full resolution of the original source image. Thus, the size of the proxy image (and the proxy scale) is just beyond the screen/display device 102 resolution. Such a proxy scale provides that the proxy image is of a size such that that the user doesn't know whether he/she is looking at the real source image or a proxy image (since the resolution being displayed is just beyond that of the display device 102 capabilities). In addition, the dynamically determined proxy image is used to perform image processing.

Figure 3:
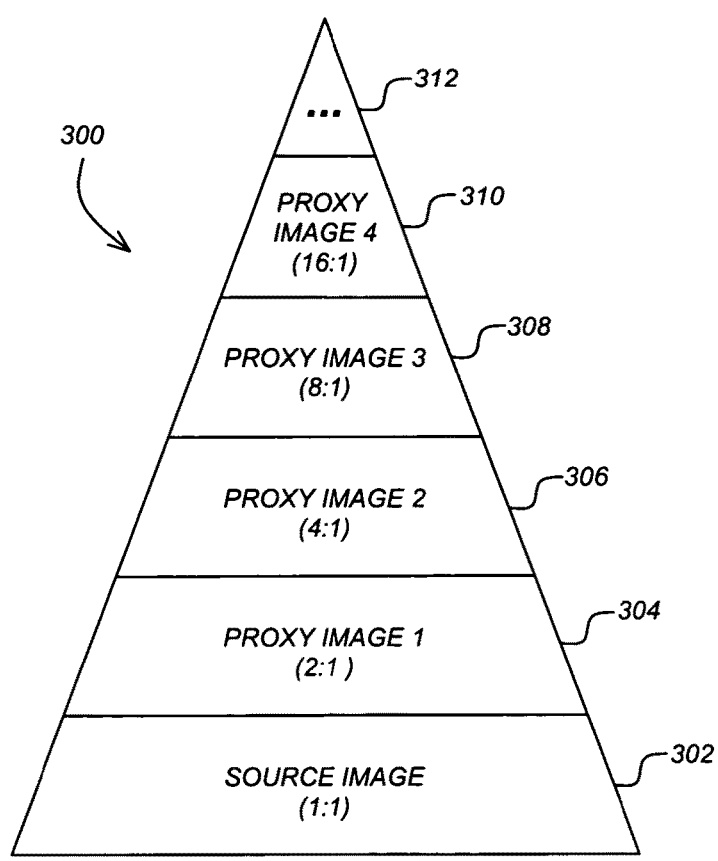
FIG. 3 illustrates examples of various proxy scales that may be used in accordance with one or more embodiments of the invention.

In view of the above, the invention provides at least two (2) distinct advantages: (1) the media player 108 determines the resolution (i.e., proxy scale) and performs processing dynamically as the clip is played on a frame-by-frame basis, and (2) the resolution is higher than that of the display device 102 but lower than the full resolution. To accommodate such processing by the media player 108, the various proxy images are created and extracted from the source image (e.g., upon importing the source image). As illustrated in FIG. 3, the system may pre-compute a pyramid 300 of all proxy images 304-312 for the source image 302. The pyramid 300 merely illustrates examples of the various proxy scales (e.g., 1:1, 2:1, 4:1, 8:1, 16:1, etc.) for the source image 302 and proxy images 304-312 that may be used. Alternative, additional, or fewer proxy images and proxy scales may be used in accordance with the invention.

Each of the different proxy images (at the various resolutions) may potentially be stored in cache 208A, 208B on computer 100. By storing the images in cache, the system 100 stays responsive while displaying proxy images for very large resolution source images. Such responsiveness results because the media player 108 is not actually computing the large resolution image for the display but merely the scaled proxy image. In this regard, the proxy image is of sufficient quality with respect to the resolution of the display device 102 such that the user cannot see a noticeable difference between the source image as displayed and the proxy image.

When determining the appropriate proxy scale to use, the media player 108 may base its decision on various properties such as the resolution of the original source image 302 or the zoom factor desired in the media player 108 (e.g., by the user).

The media player 108 or other image processing applications configured to communicate with media player 108 perform any necessary image processing on the smaller resolution proxy image 304-312 instead of the large resolution source image 302. For example, image processing operations such as color correction, compositing, resizing, etc. may be performed on the proxy image 304-312. Thus, the use of a proxy scale is propagated from the display subsystem in the media player 108 down to the image processing subsystem of the media player.

To perform such processing and to select the appropriate proxy image, the media player 108 (or display subsystem) drives the system 100 by requesting a frame/result at a particular resolution/proxy scale from an image processing subsystem that is configured to perform image processing. As described above, the particular resolution/proxy scale requested may depend on the resolution of the original source image 302, the resolution of the display device 102, and the zoom factor desired in the media player 108. In this regard, the display system determines which tiles are needed at which proxy scale.

If all of the different proxy images are available in cache 208A, 208B (as described with respect to FIG. 3) (even for larger images), the media player 108 may merely retrieve/utilize the appropriate proxy image from cache 208A, 208B. Alternatively, the image processing subsystem may fetch tiles from the caches and run image processing steps to create results that are returned to the display subsystem.

Accordingly, the media player 108 can continue working interactively even with high resolution images. In this regard, the media player 108 and system 100 remains responsive to other applications regardless of the resolution of the image being displayed or processed. Such responsiveness is attributable to the interaction between the display subsystem and image processing system. In addition, responsiveness may increase based on the location of the proxy images in cache and because the display subsystem is not actually computing large resolution images but merely the proxy scale which is requested from the image processing subsystem.

Logical Flow

Figure 4:
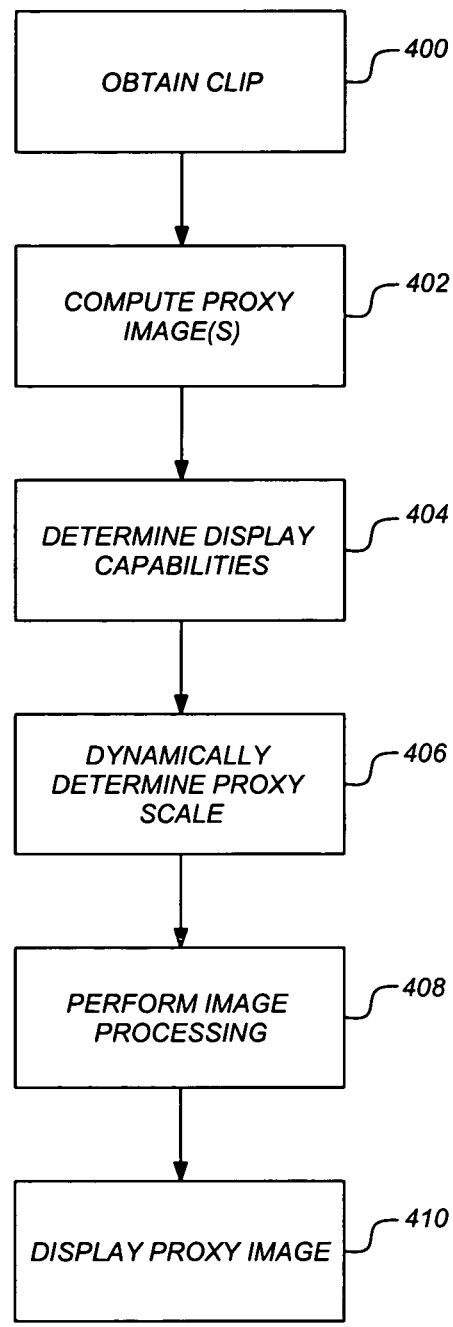
FIG. 4 sets forth the logical flow for implementing a method in accordance with one or more embodiments of the invention.

The above description sets forth the various architectural design features used for implementing the invention. FIG. 4 sets forth the logical flow for implementing a method in accordance with one or more embodiments of the invention.

At step 400, an audio/video clip having one or more frames is obtained. Each frame has a source image and a respective source image resolution. At step 402, a pyramid of proxy images (each having an associated proxy image resolution half of the previous one) are computed. Such computing may be performed when the source image is imported into the computer system of the invention. Each proxy image is associated with the source image. Further, each proxy image is a scaled version of the source image. The ratio of the proxy image resolution to the source image resolution is referred to as the proxy scale. Accordingly, each proxy image may be referred to using the proxy scale. It may also be noted that as part of step 402, each proxy image may be stored in cache. Such storage may be viewed as the process of pre-computing a pyramid of all proxy image resolutions when the source image is imported into the system followed by storing the pre-computed proxy images into the cache.

At step 404, the media player or display subsystem of the media player determines the display capabilities of a display device. At steps 406 and 408, the media performs various functions while processing the clip and based on the capabilities of the display device. In this regard, the processing of the clip at step 408 may consist of playing the clip on the display device while performing various steps dynamically on-the-fly. Namely, at step 406, the media player dynamically determines the appropriate proxy scale for each frame in the clip. Such a determination is made on the fly while the clip is being played by the media player. In addition, the proxy scale to be used likely provides for a proxy image resolution that is higher than the resolution of the display device but lower than the source image resolution. For example, the proxy image resolution to be used may be just beyond the display device resolution.

The determined proxy scale is then forwarded to the image processing system of the media player which fetches tiles from the caches and runs image processing steps to create results that are returned to the display subsystem at step 408. As described above, if the proxy images are stored in cache, step 408 may include retrieving the appropriate proxy image from cache as the clip is processed.

At step 410, the respective proxy image (for each frame in the clip) is displayed on the display device (e.g., by the display subsystem of the media player). Accordingly, in addition to displaying a proxy image (rather than the source image), the media player performs image processing using the proxy images.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for processing a clip comprising:
    (a) obtaining the clip comprising one or more frames, wherein each of the one or more frames comprises a source image having a source image resolution;
    (b) computing one or more proxy images associated with the source image of each of the one or more frames, wherein:
        (i) each of the one or more proxy images is a scaled version of the source image with which it is associated;
        (ii) each of the one or more proxy images has an associated proxy scale and a proxy image resolution; and
        (iii) each of the one or core proxy image resolution comprises a scaled version of one of the one or more source image resolutions that has been scaled based on one of the one or more associated proxy scales,
    (c) a media player determining display capabilities for a display device;
    (d) the media player playing the clip;
    (e) while the media player is playing the clip and based on the display capabilities, the media player:
        (i) dynamically determining a determined proxy scale for each frame in the clip; and (ii) displaying, on the display device, one of the one or more proxy images based on the determined proxy scale; and (f) the media player performing image processing for the clip on the one or more proxy images.

2. The method of claim 1 wherein: each of the one or more proxy images is stored in a cache; and the media player retrieves one of the one or more proxy images based on the determined proxy scale from the cache as the clip is played.

3. The method of claim 1 further comprising: importing one of the source Images into a cache;

Upon importing, computing a pyramid of the one or more proxy images associated with the imported one of the source images at all proxy image resolution; and storing the pyramid of the one or more proxy images into the cache.

4. The method of claim 1 wherein the determined proxy scale for one of the one or more frames, provides that the proxy image resolution for one of the one or more proxy images is higher than a display device resolution of the display device but lower than the source image resolution for the source image that the one or more proxy images is associated with.

5. A computer implemented system for processing a clip comprising:

(a) a computer communicatively coupled to a display device, (b) the display device c) the clip comprising one or more frames, wherein each of the one or more frames comprises a source image having a source image resolution;

(d) one or more proxy images associated with the source image of each of the one or more frames, wherein:

(i) each of the one or more proxy images is a scaled version of the source image with which it is associated;

(ii) each of the one or more proxy images has an associated proxy scale and a proxy image resolution; and (iii) each of the one or more proxy image resolution comprises a scaled version of one of the one or more source image resolutions that has been scaled based on one of the one or more associated proxy scales, (e) a media player executed by the computer configured to:

(i) determine display capabilities for the display device;

(ii) play the clip;

(iii) during playing of the clip and based on the display capabilities:

(1) dynamically determine a determined proxy scale for each frame in the clip; and (2) display, on the display device, one of the one or more proxy images based on the determined proxy scale; and (iv) perform image processing for the clip on the one or more proxy images.

6. The system of claim 5 further comprising: a cache configured to store each of the one or more proxy images; and wherein the media player is further configured to retrieve one of the one or more proxy images based on the determined proxy scale from the cache as the clip is played.

7. The system of claim 5 further comprising a computer having a processor, wherein the computer is configured to: import one of the source images into a cache;

upon importing, compute a pyramid of the one or more proxy images associated with the imported one of the source images at all proxy image resolutions; and store the pyramid of the one or more proxy images into the cache.

8. The system of claim 5 wherein the determined proxy scale for one of the one or more frames, provides that the proxy image resolution for one of the one or more proxy images is higher than a display device resolution of the display device but lower than the source image resolution for the source image that the one or more proxy images is associated with.

9. A non-transitory program storage device, readable by a computer, tangibly embodying at least one program of instructions executable by the computer to perform method steps of processing a clip, the method steps comprising the steps of:

(a) obtaining the clip comprising one or more frames, wherein each of the one or more frames comprises a source image having a source image resolution;

(b) computing one or more proxy images associated with the source image of each of the one or more frames, wherein:

(i) each of the one or more proxy images is a scaled version of the source image with which it is associated;

(ii) each of the one or more proxy images has an associated proxy scale and a proxy image resolution; and (iii) each of the one or core proxy image resolution comprises a scaled version of one of the one or more source image resolutions that has been scaled based on one of the one or more associated proxy scales, (c) a media player determining display capabilities for a display device;

(d) the media player playing the clip;

(e) while the media player is playing the clip and based on the display capabilities, the media player:

(i) dynamically determining a determined proxy scale for each frame in the clip; and (ii) displaying, on the display device, one of the one or more proxy images based on the determined proxy scale; and (f) the media player performing image processing for the clip on the one or more proxy images.

10. The non-transitory program storage device of claim 9 wherein: each of the one or more proxy images is stored in a cache; and the media player retrieves one of the one or more proxy images based on the determined proxy scale from the cache as the clip is played.

11. The non-transitory program storage device of claim 9, the method steps further comprising: importing one of the source images into a cache;

upon importing, computing a pyramid of the one or more proxy images, associated with the imported one of the source images, at all proxy image resolutions; and storing the pyramid of the one or more proxy images into the cache.

12. The non-transitory program storage device of claim 9 wherein the determined proxy scale, for one of the one or more frames, provides that the proxy image resolution for one of the one or more proxy images is higher than a display device resolution of the display device but lower than the source image resolution for the source image that the one or more proxy images is associated with.

\* \* \* \* \*